United States Patent [19]
Willhite

[11] Patent Number: 6,065,834
[45] Date of Patent: May 23, 2000

[54] REPLACEABLE PADS FOR EYEGLASS TEMPLE AND NOSE PIECES AND METHOD OF APPLICATION

[76] Inventor: Paul Frank Willhite, Rte. 1 Box 65, Downsville, La. 71234

[21] Appl. No.: 08/922,098

[22] Filed: Sep. 2, 1997

[51] Int. Cl.[7] .................................................. G02C 5/14
[52] U.S. Cl. ............................................. 351/122; 351/139
[58] Field of Search ...................................... 351/122, 139

[56] References Cited

U.S. PATENT DOCUMENTS 4,662,729  5/1987  Dobson ................................... 351/122
5,389,980  2/1995  Lin .......................................... 351/139

*Primary Examiner*—Huy Mai

[57] ABSTRACT

A set of wrappings for eyeglass ear and nose pieces to be applied by the eyeglass wearer. The wrappings are precut from a thin elastic material having a textured latex coating and shaped to be wrapped in an overlapping manner along the ear pieces of eyeglasses. A pair of nose pad covers is also provided, precut in a manner which allows the material to be stretched and folded around an eyeglass nose piece. The material providing non-slip resistance, moisture absorbency and dissipation and padding for extra sensitive skin.

7 Claims, 2 Drawing Sheets

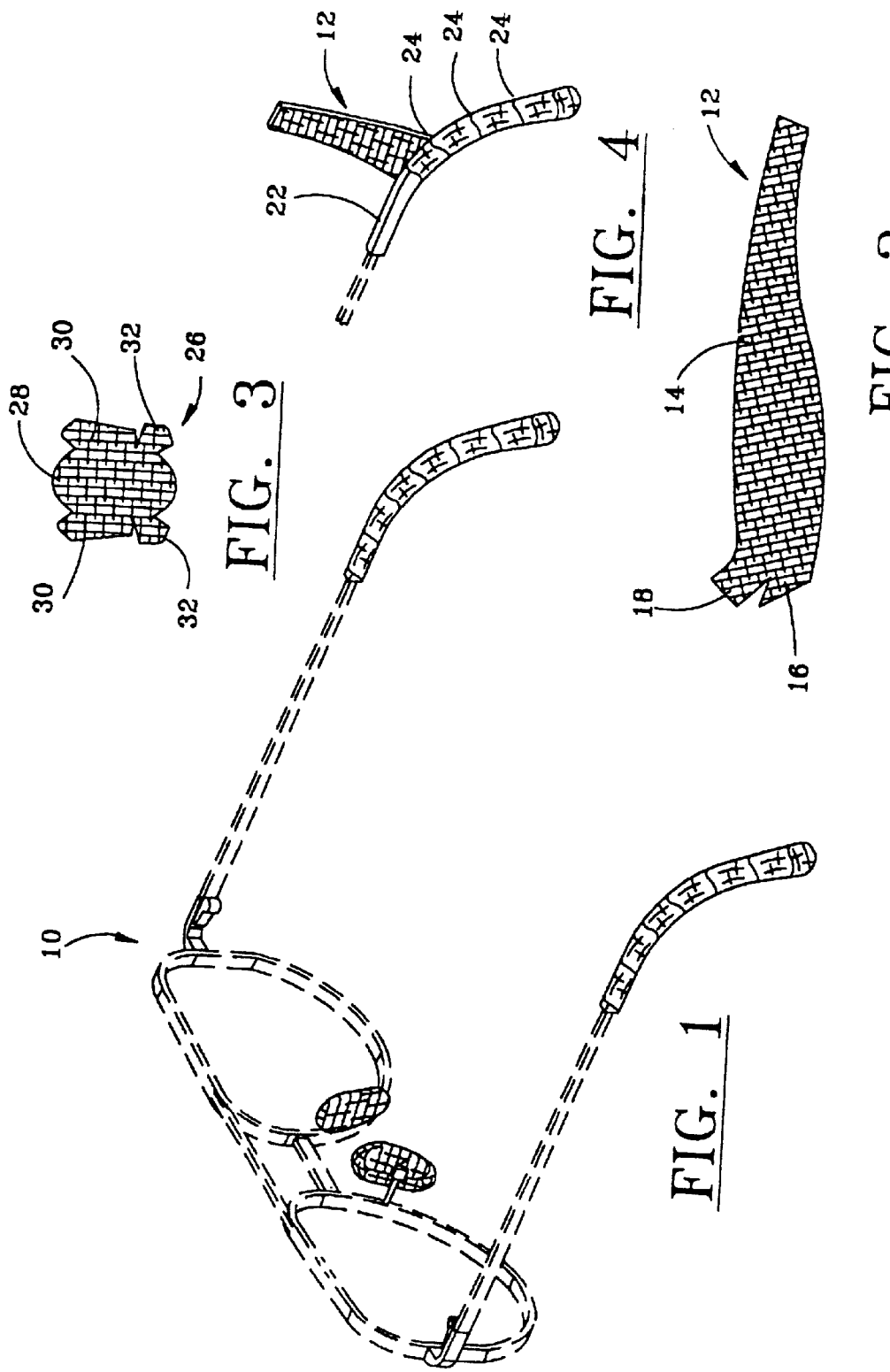

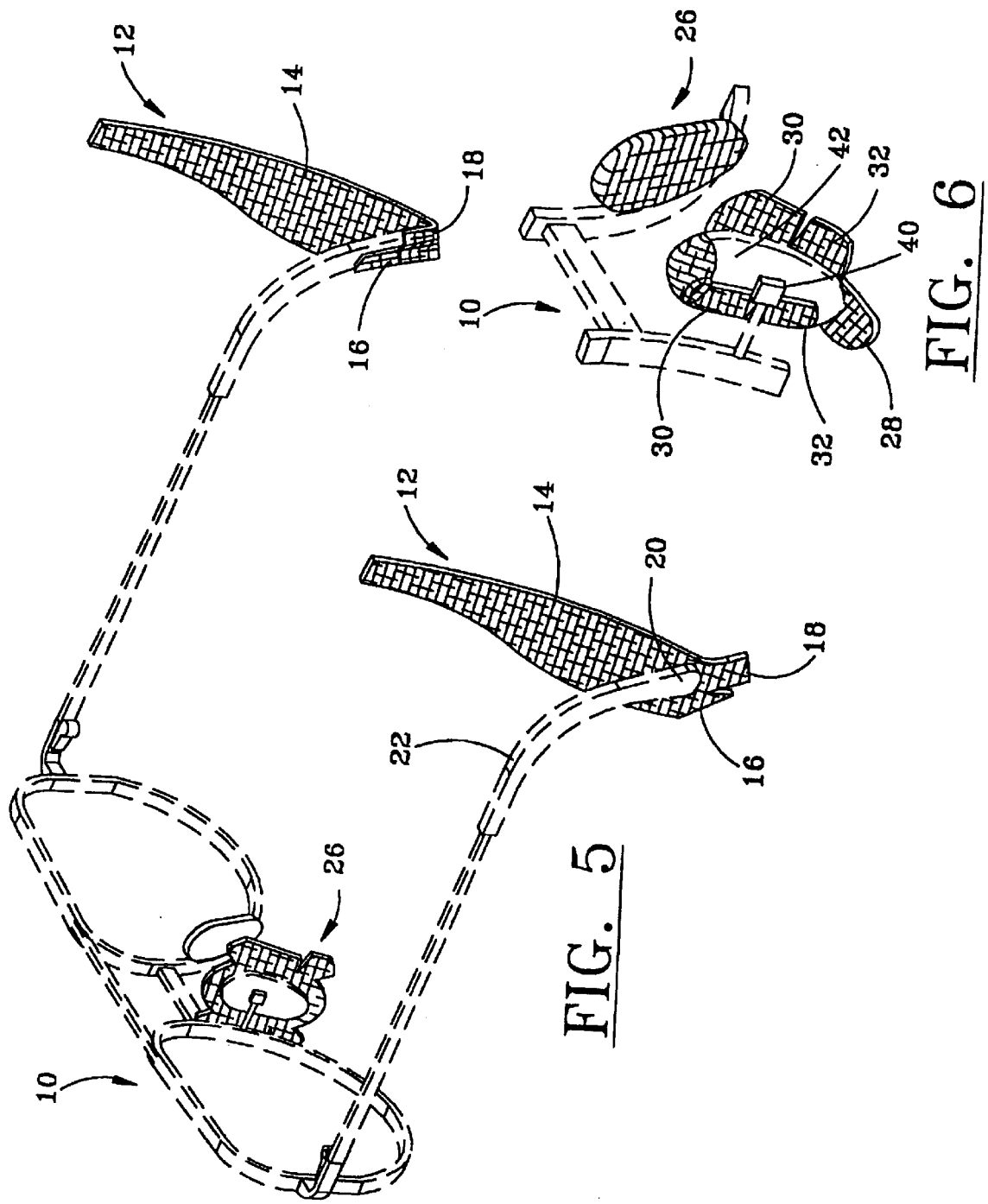

REPLACEABLE PADS FOR EYEGLASS TEMPLE AND NOSE PIECES AND METHOD OF APPLICATION

BACKGROUND OF THE INVENTION

1. Field of the Invention

This invention relates generally to eyeglasses and more particularly to protective wrappings for eyeglass temple pieces, pads for nose pieces, and their method of application.

2. General Background

It is well known in the art of eyeglass frame design that there are many problems encountered by the wearer due to interaction between the temple and the nose pieces. Eyeglasses tend to move relative to the wearer due primarily to sudden and erratic movements, improper fits, and perspiration. Such movement of the frames relative the wearer causes irritation and the problem is further compounded by those with overly sensitive skin. Eyeglass frame manufacturers tend to ignore the problem. Therefore, the eyeglass wearer must seek relief from various attachments provided in the after market. Various structures have been developed which addresses the problem outlined above by assuming that if the frames can be stabilized there will be no friction, thus no irritation. Such structures ;which simply cover, pad cushion, and anchor the eyeglass frames as described in U.S. Pat. Nos., 3,953,114; 4,662,729; 4,786,158; 5,002,381; 5,440,335; 5,583,585; and Des. No. 322,446 generally cause as many problems as they are intended to solve. One such problem is that most structures of the type disclosed are not universal and seldom fit the wide variety of frames available. Sleeves, when applied to eyeglass frame temple pieces tend to make the frames bulky, thereby causing ear irritation. Secondly, moisture is a root problem of eyeglass frame slippage yet virtually none of the temple piece pads or covers, with the exception of the U.S. Pat. No. 4,662,729, emphasize moisture absorption or dissipation.

Nose pads for eyeglasses have virtually the same problems as the temple pieces except the problem is compounded by the weight of the glasses. Therefore, there is a need to provide a universal fitting, thin, soft, replaceable material, that is moisture absorbent and or excellent moisture dissipater, yet clings to the skin without irritation and is easily attached in a contouring manner to the eyeglass frames.

SUMMARY OF THE INVENTION

The instant addresses the problem described above in a straight forward and simple manner. A combination of two percent latex and ninety-eight percent cotton material having a wavy surface texture is used as a wrap for the nose and ear pieces of the eyeglass frames. The material, being self-clinging, provides air circulation and nonskid capability with skin even when moist. The cotton and latex material is cut in a manner which enhances a wrapping application.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 1 is isometric view of the nose and ear piece wraps as they appear on a pair of glasses;

FIG. 2 is a top view of the ear piece wrap;

FIG. 3 is a top view of the nose piece wrap;

FIG. 4 is an isometric view of eyeglass ear piece being wrapped with the invention;

FIG. 5 is an isometric view of a pair of eyeglasses being wrapped with the invention; and FIG. 6 is a partial view of the eyeglass nose piece being wrapped,

DETAILED DESCRIPTION OF THE PREFERRED EMBODIMENT

As shown in FIG. 1 the nose and ear pieces of a pair of eyeglasses 10 may be wrapped with a thin material consisting of two percent latex and ninety-eight percent cotton that is both self-clinging, due to surface texture, and moisture absorbent, as a result of the cotton content, such as that used in elastic bandages. The material thickness ranges between 0.015 and 0.031 inches. The material may be described as an elastic material having a cotton weave coated with a textured latex.

To make the wrapping process simple and easy to use the material should be cut as shown in FIG. 2 and 3. The ear piece wrap 12 shown in FIG. 2 is cut in a strip having tapering body 14 and a bifurcated end with a first, relatively straight, branch 16 and a second branch 18 oblique to the tapered body portion 14. This allows the longer, oblique branch 18 to be folded over the ear piece end 20, shown in FIG. 5, in a manner whereby the straight branch 16 is then folded over the second oblique branch end 18, thus positioning the wrap 12 at an angle to the ear piece 22. Therefore, continuing the wrapping process as seen in FIG. 4, a neat series of overlaps 24 is achieved as the ear piece 22 is covered. The texture of the material 12 and the ridges created by the overlaps 24 also serve as standoffs, thereby allowing moisture to be dissipated, as well as provide friction and skin padding.

The nose piece wrapping 26 as seen in FIG. 3 is cut in butterfly pattern which includes an oval body portion 28, a pair of wing portions 30 and tabs 32. As seen in FIG. 6, the nose wrap 26 must fit around the support column 40. Therefore, by stretching the elastic material body 28 over the face of an eyeglass nose piece 42, the wings 30 can be folded around and along the sides of the piece 42 and anchored by wings 30 and tabs 32 which fold neatly around the support column 40.

The wrappings 12, 26 are supplied in an inexpensive set of two ear piece wraps and two nose piece wraps, along with instructions showing how to apply. The user then applies the wrappings to virtually any type of eyeglasses on an as needed basis. The wraps 12,26 may also be removed, cleaned and reused if desired.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A set of wrappings for eyeglass ear and nose pieces comprising:

a) a pair of eyeglass ear piece wraps custom cut from a thin elastic material consisting of a blend of latex and cotton having surface texture; and b) a pair of eyeglass nose piece wraps custom cut from said thin elastic material.

2. A set of wrappings for eyeglass ear and nose pieces according to claim 1 wherein said ear piece wraps are defined by a tapered body portion having non-parallel sides and a bifurcated end comprising first and second branches, said second branches being oblique to said body portion and longer than said first branch.

3. A set of wrappings for eyeglass ear and nose pieces according to claim 1 wherein said nose piece wraps are defined by an oval body portion having wing portions and tab portions.

4. A set of wrappings for eyeglass ear and nose pieces according to claim 1 wherein said thin material has thickness between 0.015 and 0.031 inch.

5. A set of wrappings for eyeglass ear and nose pieces according to claim 1 wherein said thin elastic material is comprised of an elastic base material containing cotton weave with a textured latex coating.

6. A method of wrapping an eyeglass ear piece with a precut elastic wrapping material consisting of a latex and cotton blend comprising the steps of:

a) positioning said precut elastic material at end of said eyeglass ear piece;

b) anchoring said precut elastic wrapping to said end of eyeglass ear piece by folding and overlapping an end portion of said precut elastic material;

c) wrapping said eyeglass ear piece with said precut elastic wrapping material in an overlapping manner until said ear piece is completely covered.

7. A method of applying a wrapping to an eyeglass ear and nose piece comprising:

a) providing a precut ear piece wrapping comprising of a thin elastic material consisting of a blend of latex and cotton having surface texture, a tapered body portion having non-parallel sides with a bifurcated end comprising first and second branches, said second branch being oblique to said body and longer than said first branch;

b) applying said bifurcated end of said wrapping to said eyeglass ear piece in a manner whereby an end portion of said eyeglass ear piece is in contact with and generally parallel to end of said first branch and end of said second branch is perpendicular to end of said ear piece;

c) folding said second branch over said ear piece end portion and folding said first branch over said second branch;

d) winding said tapered body portion in an overlapping manner upwards along said eyeglass ear piece;

e) providing a precut nose piece wrapping comprised of a thin elastic material consisting of a blend of latex and cotton having surface texture and having an oval body portion, wings, and tab portions; and f) stretching said oval body portion over a face of said eyeglass nose piece in a manner whereby said wings and tabs are folded over a portion of said nose piece opposite said face.

* * * * *